United States Patent
Schifflechner et al.

(10) Patent No.: US 6,224,095 B1
(45) Date of Patent: May 1, 2001

(54) PROCESS FOR CONTROLLING A PASSENGER PROTECTION SYSTEM

(75) Inventors: Achim Schifflechner, Ingolstadt; Gerhard Schilling, Aresing; Gerhard Wagner, Schrobenhausen; Martin Weber, Kirchseeon, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/512,719

(22) Filed: Feb. 24, 2000

(30) Foreign Application Priority Data

Mar. 5, 1999 (DE) ............................... 199 09 403

(51) Int. Cl.$^7$ ............... B60R 21/32; B60R 21/02; B60R 16/02; B60N 2/42
(52) U.S. Cl. ............................................. 280/735
(58) Field of Search ............................... 280/735

(56) References Cited

U.S. PATENT DOCUMENTS

| | | | |
|---|---|---|---|
| 5,570,903 | * | 11/1996 | Meister et al. ................ 280/735 |
| 5,609,358 | * | 3/1997 | Iyoda et al. ................... 280/735 |
| 5,726,887 | * | 3/1998 | Spies et al. ................... 280/735 |
| 5,992,879 | * | 11/1999 | Bögge ........................... 280/735 |

FOREIGN PATENT DOCUMENTS

| | | |
|---|---|---|
| 3924595A1 | 1/1991 | (DE) . |
| 4424020A1 | 1/1996 | (DE) . |
| 19547333A1 | 6/1997 | (DE) . |
| 19611073A1 | 9/1997 | (DE) . |
| 19615321A1 | 10/1997 | (DE) . |
| 19724344C1 | 8/1998 | (DE) . |
| 19713914A1 | 11/1998 | (DE) . |
| 0728636A1 | 8/1996 | (EP) . |

* cited by examiner

*Primary Examiner*—Kenneth R. Rice
(74) *Attorney, Agent, or Firm*—Mark P. Calcaterra

(57) ABSTRACT

Described here is a process for controlling a passenger protection system by means of a CPU in conjunction with acceleration signals and the existence of at least one trigger inhibiting signal from a manually operated trigger inhibitor or a seat occupancy detection device. This process prevents errors in the CPU.

For this purpose, monitoring of the trigger inhibitor and the seat occupancy detection devices is provided in an evaluation unit parallel to the CPU, in order to set an ignition inhibiting signal, as soon as at least one of these devices sets a trigger inhibiting signal. The ignition inhibiting signal influences the inhibiting device located between the CPU and the passenger protection device, disabling the trigger. This makes it impossible for an error in the CPU to trigger the passenger protection device inadvertently.

3 Claims, 2 Drawing Sheets

PROCESS FOR CONTROLLING A PASSENGER PROTECTION SYSTEM

BACKGROUND OF THE INVENTION

This concerns a process for controlling a passenger protection system. Examples of processes for controlling a passenger protection system by means of a CPU in conjunction with acceleration signals, taking into consideration the seat occupancy can be found in DE 195 47 333 A1, DE 196 15 321 A1, DE 196 11 073 A1 or DE 197 24 344 C1. Here the triggering of at least one passenger protection device, especially the front passenger airbag, will be inhibited, whatever the acceleration signal, if the central processing unit (CPU) receives a trigger inhibiting signal from one of the seat occupancy detection devices. Contact switches in the vehicle seat, pressure or capacitance sensors, light barriers, echo/reflex procedures or imaging systems are used for this type of seat occupancy detection device.

In addition to this, we are already familiar with manually operated trigger inhibitors, which the driver or the front passenger can use to enable or disable triggering of the passenger protection devices. For example, EP 0 728 636 A1 describes the possibility, despite a seat occupancy detection device transmitting an inhibiting signal, of still being able to switch on the passenger protection device manually.

Here, triggering is usually controlled by means of a CPU with a microprocessor, which is programmed by the software to detect and process the acceleration and trigger inhibiting signals. Unfortunately, with microprocessors, you cannot totally rule out the possibility that a software glitch or interference signals could cause temporary malfunctions. DE 197 43 914 A1 therefore recommends a process for controlling a passenger protection system in which, redundantly to the microprocessor, in an evaluation unit preceding the microprocessor, a release signal for the ignition units will be derived from the acceleration signals if the acceleration signals exceed a predetermined threshold. The ignition units will then only be triggered if both the ignition command and the release signal are present. An acceleration signal processing error in the CPU cannot then lead directly to triggering, at least not until the threshold for the release signal has been exceeded. The circuit of the preceding evaluation unit, for its part, can be clearly designed as a CPU with a microprocessor, so that this evaluation unit is not susceptible to interference and especially not prone to software glitches and interrupts.

In addition to this, DE 196 11 073 A1 also mentions the possibility of the evaluation unit equipped with a microprocessor only detecting the acceleration signals and generating a corresponding trigger signal, while a separate evaluation unit is provided for seat occupancy detection and used to generate a releasing or inhibiting signal, which is logically linked to the trigger signal in a gate circuit, so that if a release signal is present in connection with the trigger signal, the ignition circuit can ignite the airbag.

DE 39 24 595 A1 tells of a control layout for a passenger protection system, where a monitoring circuit monitors the frequency of a test signal generated by a microprocessor and any deviation will prevent triggering of the passenger protection devices, by activating an inhibiting device between the CPU and the passenger protection device.

DE 44 24 020 A1 likewise describes the supervision of a control unit of a safety device by an additional control unit.

SUMMARY OF THE INVENTION

Monitoring the trigger inhibitor and the seat occupancy detection devices in an evaluation unit in parallel to the CPU makes it possible to devise a process for controlling a passenger protection system by means of a CPU depending on acceleration signals and the existence of at least one trigger inhibiting signal from a manually operated trigger inhibitor or a seat occupancy detection device. This process prevents errors in the CPU. The evaluation unit sets an ignition inhibiting signal, as soon as at least one of these devices sets a trigger inhibiting signal.

The ignition inhibiting signal influences an inhibiting device located between the CPU and the ignition circuit, causing the trigger to be inhibited. This makes it impossible for an error in the CPU to trigger the passenger protection device inadvertently.

It is an extremely simple matter for the evaluation unit to carry out a plausibility check on the individual trigger inhibiting signals using logic gates, without the need for expensive software which is susceptible to interference. A circuit breaker for the ignition circuit or a gate circuit to stop the ignition signal being forwarded to the output stage, can be used as an inhibiting device.

DESCRIPTION OF THE PREFERRED EMBODIMENTS

Figure 1:
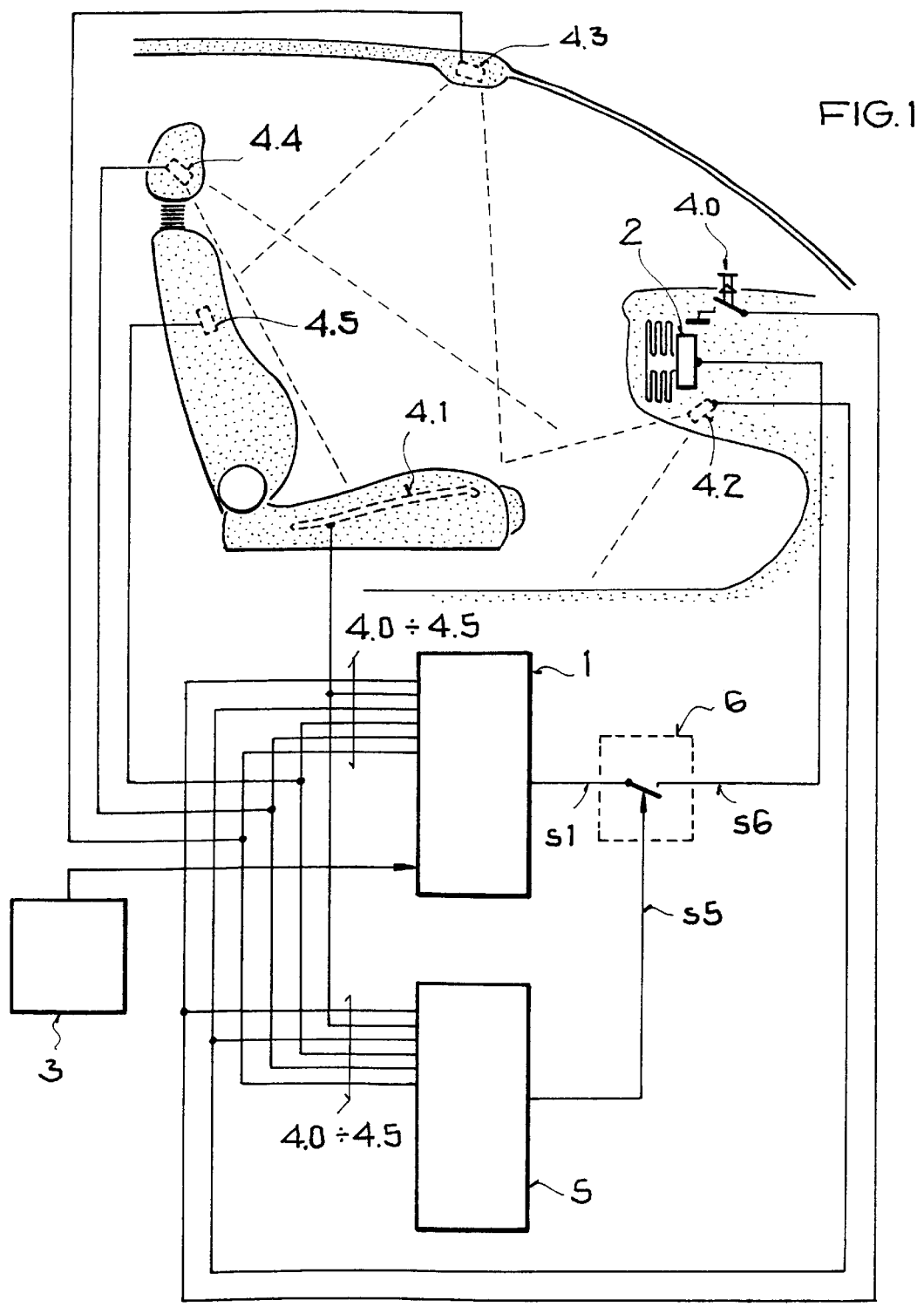
FIG. 1 Passenger protection system with an evaluation unit parallel to the CPU to monitor the trigger inhibitor and the seat occupancy detection devices and to generate an ignition inhibiting signal.

FIG. 1 shows the front passenger seat of a vehicle with a passenger protection device 2 assigned to this seat, embodied as a front airbag, although obviously, additional passenger protection devices such as sidebags or seatbelt pretensioning devices, although not shown, can be controlled in the manner described below, in conjunction with acceleration signals and trigger inhibiting signals.

Connected to passenger protection device 2 is a CPU 1, which receives one or more acceleration signal(s) from acceleration sensors 3, on the basis of which CPU 1 detects an accident because of the characteristically sudden acceleration and sets a trigger signal s1. However, this triggering of the passenger protection device is inhibited by CPU 1, whatever the acceleration signal, if CPU 1 receives a trigger inhibiting signal from a manually operated trigger inhibitor 4.0 or/and from at least one of the seat occupancy detection devices 4.1 to 4.5. In addition to this, trigger inhibitor 4.0 and seat occupancy detection devices 4.1 to 4.5 are monitored by a separate evaluation unit 5.

The manually operated trigger inhibitor 4.0 is embodied as a switch, the output state of which is detected by CPU 1 and evaluation unit 5. It is therefore possible for the occupants of the vehicle to decide themselves whether it should be possible to trigger passenger protection device 2. Naturally, this type of manually operated trigger inhibitor 4.0 can also be dispensed with. In that case, CPU 1 and evaluation unit 5 would only detect seat occupancy detection devices 4.1 to 4.5.

Seat occupancy detection devices 4.1 to 4.5 are shown in FIG. 1 purely as an example, as there are a large number of possible concepts for seat occupancy detection, using different sensors of which one or several can be selected. FIG. 1 shows a pressure-sensitive seat mat 4.1, an optical monitoring unit 4.2 directed towards the footwell, a unit 4.3 directed towards the passenger compartment from the roof of the vehicle and additional units 4.4 and 4.5, using the optical or sound reflection principle, to illustrate clearly the large number of seat occupancy detection device options available, without laying claim to cover them all.

Seat occupancy detection devices 4.1 to 4.5 monitor the seat assigned to passenger protection device 2 and set a trigger inhibiting signal which can be logically evaluated, if a dangerous seating position or seat occupancy, especially a backward facing child seat, is detected when airbag 2 is triggered.

Whereas in CPU 1, signals from acceleration sensors 3, seat occupancy detection devices 4.1 to 4.5 and trigger inhibitor 4.0 are evaluated by the software, the signals of seat occupancy detection devices 4.1 to 4.5 and of trigger inhibitor 4.0 are also monitored in parallel in evaluation unit 5, which immediately sets an ignition inhibiting signal s5, as soon as at least one of these devices sets a trigger inhibiting signal. The ignition inhibiting signal s5 controls an inhibiting device 6 located between CPU 1 and passenger protection device 2, which inhibiting device 6 disables the trigger. A trigger signal s1 of CPU 1 can thus only lead to passenger protection device 2 being triggered, if no ignition inhibiting signal s5 is set and inhibiting device 6 is closed. This means that mistaken triggering as a result of an error in CPU 1, is no longer possible.

The inhibiting device used in FIG. 1 is a circuit breaker for the ignition circuit, although it would also be perfectly possible to use a gate circuit to prevent trigger signal s1 from being forwarded to the ignition output stage.

Figure 2:
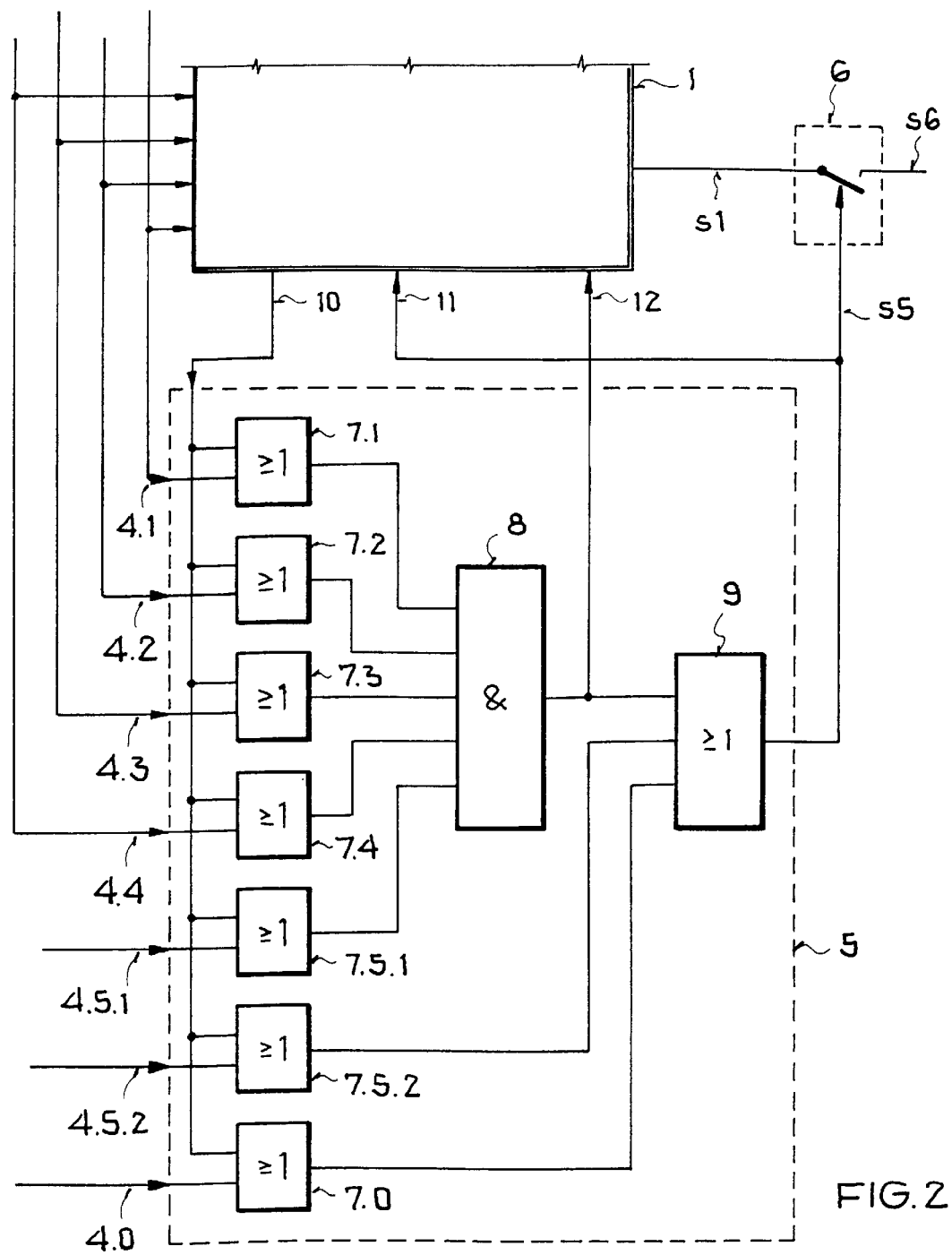
FIG. 2 A typical evaluation unit for the trigger inhibitor and the seat occupancy detection devices, as a cascaded logic gate.

FIG. 2 shows a plausibility check for an evaluation unit of the trigger inhibitor and the seat occupancy detection devices, as a cascaded logic gate. In this example, a seat occupancy detection device, that of front passenger backrest 4.5, shows two different signals, of which 4.5.1. as the first stage, represents seat occupancy which is not totally certain, which is set for difficult to coordinate signal characteristics, and 4.5.2. representing a second stage, in which the seat is safely recognisable as occupied or not occupied. Negators can be added at any time to adapt to the logic.

Whereas the stages of safe detection or the operation of the manual trigger inhibitor 4.0 lead immediately to release or inhibition, by each setting ignition inhibiting signal s5 by using a common OR gate 9, unsafe signals, such as signal 4.5.1 and that of the other seat occupancy detection devices 4.1 to 4.4 are combined in an AND gate 8. Obviously, under this principle, several more levels of logical operations for the individual signals can be added to a more extensive plausibility check.

In addition to this, if trigger signal s1 is deactivated, it is possible to check and monitor evaluation unit 5 by means of test signal 10, which is fed in parallel with the signals of trigger inhibitor 4.0 and seat occupancy detection devices 4.1 to 4.5 to the OR gates 7.0–7.5.2 which are each inserted, and thus test them, AND gate 8 and OR gate 9, by directing their outputs back to CPU 1 via lines 11 and 12. In this way it will be possible to detect defects in the logic gates at any time.

What is claimed is:

1. A process to control a passenger protection system using a control processing unit in conjunction with acceleration signals, with at least one passenger protection device, the triggering of which inhibits the control processing unit, whatever the acceleration signal, if control processing unit recognises at least one trigger inhibiting signal from at least one of a manually operated trigger inhibitor, at least one seat occupancy detection device on a seat assigned to the passenger protection device, a dangerous seating position or seat occupancy for protection devices triggering, comprising the steps of:

(a) monitoring the trigger inhibitor and the seat occupancy detection devices by an evaluation unit in parallel with the central processing unit (b) setting an inhibiting signal with the evaluation unit as soon as at least one of the monitored devices sets a trigger inhibiting signal and (c) operating an inhibiting device in response to the inhibiting signal to disable a triggering of the at least one passenger protection device.

2. Process according to claim 1, wherein the evaluation unit carries out a plausibility check of the trigger inhibiting signals of the various seat occupancy detection devices together, by forming the evaluation unit from cascaded, connected logic gates.

3. Process according to claim 1 wherein a circuit breaker is used as an inhibiting device.

* * * * *